United States Patent
Turner et al.

(10) Patent No.: US 6,363,783 B1
(45) Date of Patent: Apr. 2, 2002

(54) ALTERNATIVE LIQUID ENVIRONMENT MEASUREMENT SYSTEM AND METHOD

(75) Inventors: Randy Lee Turner, Hilliard; Donald R. Halliday, Powell, both of OH (US)

(73) Assignees: Hal-Tech, LTD, Columbus; Future Applied Scientific Technology, Elida, both of OH (US)

(*) Notice: Subject to any disclaimer, the term of this patent is extended or adjusted under 35 U.S.C. 154(b) by 0 days.

(21) Appl. No.: 09/527,167

(22) Filed: Mar. 17, 2000

(51) Int. Cl.$^7$ .............................................. G01F 23/00
(52) U.S. Cl. ..................................... 73/290 R; 73/1.73
(58) Field of Search .............................. 73/290 R, 149, 73/1.73, 1.25, 1.74, 1.36

(56) References Cited

U.S. PATENT DOCUMENTS

| | | | |
|---|---|---|---|
| 11,030 A | * 6/1854 | Clark | 73/290 R X |
| 1,233,065 A | * 7/1917 | Kritzer | 73/319 |
| 2,031,644 A | * 2/1936 | Gunderson | 73/290 R |
| 2,237,461 A | * 4/1941 | Tokheim | 73/290 U X |
| 2,619,620 A | * 11/1952 | Tapp et al. | 73/290 R |
| 3,181,342 A | * 5/1965 | Barengoltz | 73/1.73 X |
| 3,389,602 A | * 6/1968 | Clemens | 73/290 R |
| 3,396,470 A | * 8/1968 | Wood | 73/290 R X |
| 3,417,613 A | * 12/1968 | Barnstorf | 73/319 |
| 4,095,476 A | * 6/1978 | Banon | 73/747 |
| 4,702,107 A | * 10/1987 | Guerrini et al. | 73/319 |
| 4,882,925 A | * 11/1989 | Brown | 73/290 R X |
| 5,687,607 A | * 11/1997 | Brandt et al. | 73/290 R |

FOREIGN PATENT DOCUMENTS

| | | | | |
|---|---|---|---|---|
| DE | 2244536 | * | 4/1973 | B62D/5/08 |
| DE | 2924556 | * | 1/1981 | 73/1.73 |
| DE | 286219 A5 | * | 1/1991 | 73/1.73 |
| EP | 310298 | * | 4/1989 | 73/1.73 |
| JP | 509784 | * | 9/1976 | 73/1.73 |
| JP | 62-235528 | * | 10/1987 | 73/149 |

* cited by examiner

*Primary Examiner*—Thomas P. Noland
(74) *Attorney, Agent, or Firm*—Mueller and Smith, LPA

(57) ABSTRACT

Determination is made of the amount of liquid housed within a vessel subject to intermittent dynamic forces wherein the liquid in the vessel may be being discharged intermittently. The fluid in the vessel has a liquid level above which is a vessel headspace. A sensing tube of substantially less volume than the vessel is provided. This tube also is subject to the intermittent dynamic forces. The tube has tube headspace that is held at the same pressure as the vessel headspace, e.g., atmospheric pressure. The sensing tube is fitted with a sensor assembly for measuring the level of liquid therein. The tube is in fluid communication with the vessel through an orifice in the vessel whereby the fluid level in the vessel is the same as the fluid level in the tube. The size of the orifice is such that the tube fluid level measured by the sensor assembly is substantially unaffected by the intermittent dynamic forces. A further aspect of the present invention is a method for calibrating the orifice of a sensing tube to the fluid properties of the liquid housed within the vessel.

25 Claims, 5 Drawing Sheets

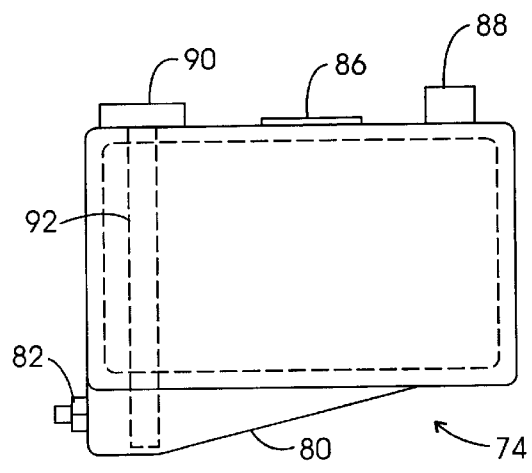
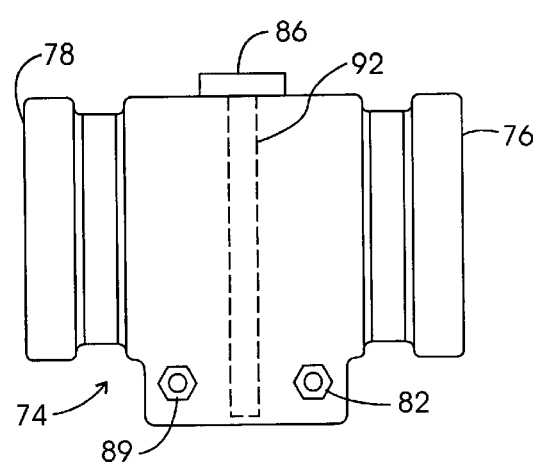
FIG. 3  FIG. 4
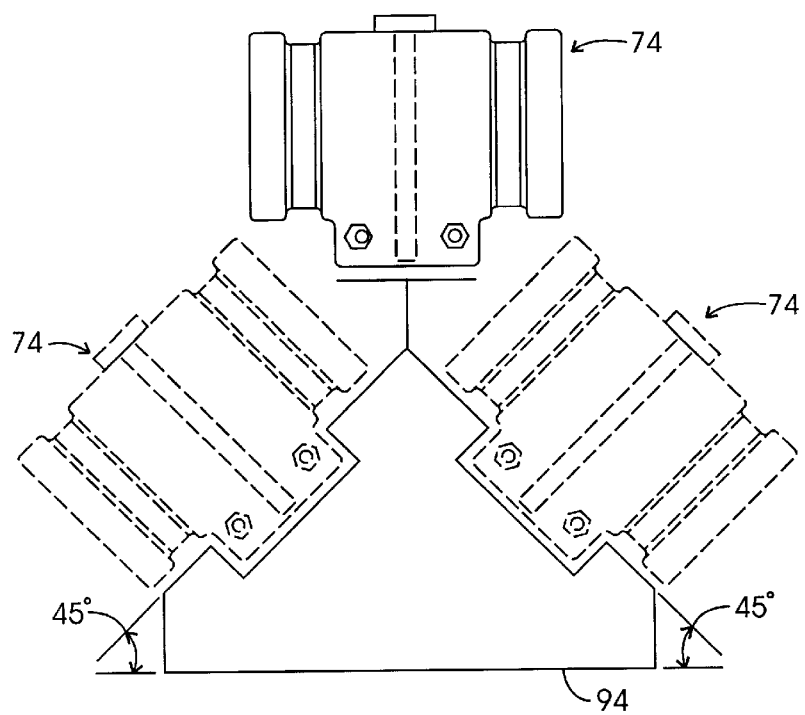
FIG. 5

ALTERNATIVE LIQUID ENVIRONMENT MEASUREMENT SYSTEM AND METHOD

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates generally to the measurement of the amount of liquid contained in a tank and more particularly to measuring such amount while such tank is subject to dynamic forces that cause the liquid to slosh about the tank. More specifically, such liquid can be fuel in a fuel tank mounted on a motorized vehicle (e.g., aircraft, race car, etc.) where knowledge of the amount of fuel in the tank is important, or hazardous material being transported in a sealed container where leakage detection is required. In particular, there is a requirement for the operator to know precisely the ultimate amount of fuel in the fuel tank.

In the automobile racecar environment, the racecar, and hence its fuel tank or fuel cell, is subject to tremendous dynamic forces especially during turns. Measurement of the amount of fuel in the fuel cell becomes problematic at best, especially when the fuel is near exhaustion. The driver, as well as the race team manager, need to precisely know how much fuel actually remains in the fuel cell so that pit stops can be managed and the car does not run out of fuel. Conventional fuel cell sensor systems leave a great deal to be desired in this regard. Although not as time sensitive, operators of ordinary passenger automobiles also require knowledge of the amount of fuel remaining. In a more critical situation, the operator of an aircraft even more so needs to know when the fuel tank is almost empty and precisely how much fuel remains as the fuel nears exhaustion (i.e., ultimate amount of fuel).

In a different context, hazardous liquids often are required to be transported by truck, rail, or other means of transportation. During such transportation, the operation needs to be made aware of any leaks that develop from this storage tank while it is in motion. During transit, however, the hazardous liquids will be subject to dynamic forces of movement that make precise measurement of unexpected leaks very difficult to determine.

Thus, there exists a need to measure the amount of liquid housed within a storage container therefor when the container is subject to dynamic forces that cause the fuel level to fluctuate and make its measurement difficult. Heretofore, U.S. Pat. No. 1,233,065 proposes a gasoline gage mounted on the dashboard of a motor vehicle consisting of an isolation tube for a fuel level sensor, with a bottom-level opening for admitting fuel and a headspace outlet.

U.S. Pat. No. 3,417,613 proposes an immersed tube level indicator in automobile vehicles with an isolation tube containing a floating fuel level sensor. The tube also has a small opening at its lower for the feeding of fuel and at its upper end for venting. The sensor type used with the device is a float type.

U.S. Pat. No. 4,702,107 proposes a device for detecting the level of fuel contained within a tank. An isolation tube with a bottom inlet and headspace outlet houses a sensor consisting of a combined vertical bar with a printed circuit board and a float.

U.S. Pat. No. 5,687,607 proposes a device for measuring the quantity of fuel in a space vehicle. The device consists of an isolation tube located either inside or outside the fuel tank with a bottom inlet and headspace outlet. The sensor located within is preferably the capacitive method.

While these proposals are adequate for some purposes, they leave much room for improvement.

BRIEF SUMMARY OF THE INVENTION

Determination is made of the amount of liquid housed within a vessel subject to intermittent dynamic forces wherein the liquid in said vessel possibly is being discharged intermittently. The fluid in the vessel has a liquid level above which is a vessel headspace. A sensing tube of substantially less volume than said vessel is provided. This tube also is subject to the intermittent dynamic forces. If the tube and vessel have headspace not occupied by fluid, such headspaces are held at the same pressure, e.g., atmospheric pressure. The sensing tube is fitted with a sensor assembly for measuring the level of liquid therein. The tube is in fluid communication with the vessel through an orifice in the vessel whereby the fluid level in the vessel is the same as the fluid level in the tube. The size of the orifice is such that the tube fluid level measured by the sensor assembly is substantially unaffected by the intermittent dynamic forces.

Desirably, the tube is centrally located within the vessel and close to the bottom of the vessel. Further, is desirable that the tube be symmetrical in shape, e.g., cylindrical, square, or other such shape. Such features enhance the accuracy of the tube and response rate of the tube in measuring the ultimate amount of liquid remaining in the vessel or the initial discharge of liquid from the vessel.

A further aspect of the present invention is a method for calibrating an orifice of a sensing tube having an orifice, wherein the orifice is in fluid communication with liquid housed within a vessel whereby the fluid level in the vessel is the same as the fluid level in the sensing tube. The sensing tube is fitted with a sensor assembly for measuring the level of liquid in the sensing tube. The sensor assembly is connected to a read-out monitor. The vessel and the tube are subject to intermittent dynamic forces and the liquid in the vessel may be discharged intermittently. This method correlates the size of the tube orifice to the fluid properties of the liquid housed in the vessel, whereby the size of the orifice is such that the tube liquid level measured by the sensor assembly is substantially unaffected by the intermittent dynamic forces.

Advantages of the present invention include the ability to accurately measure the amount of liquid housed within a vessel easily and quickly regardless of whether the vessel is at rest or is subject to disturbing dynamic forces. Another advantage is that such liquid measurement capability can be easily retrofitted to existing vessels. A further advantage is that such liquid measurement is simple in construction and easy to operate. These and other advantages will become readily apparent to those skilled in the art based upon the instant disclosure.

BRIEF DESCRIPTION OF THE DRAWINGS

For a fuller understanding of the nature and objects of the present invention, reference should be had to the following detailed description taken in connection with the accompanying drawings in which:

FIG. 3 is a side elevational view of the 4 gallon fuel tank fitted with the ALE tube that was used to gather data reported in the Example;

FIG. 4 is a front elevational view of the fuel tank of FIG. 3;

FIG. 5 is a side elevational view of the test fixture used to test the ALE tube in the fuel tan, K of FIGS. 3 and 4;

The drawings will be described in detail below.

DETAILED DESCRIPTION OF THE INVENTION

Large volumes of fluid subject to dynamic forces exhibit unstable surfaces due the application of such dynamic forces. This instability colloquially is referred to as "slosh." Unfortunately, when measurement of the volume of liquid in a tank is desired, such sloshing liquid makes accurate measurement quite difficult at best, especially as accuracy in real time is a requirement. It also is true that such slosh is diminished as the cross-sectional area of the liquid surface decreases. Thus, a sensor calibrated to determine the location of the liquid surface (and from which volume of liquid can be determined) becomes less affected by dynamic forces as the cross-sectional area of the surface decreases. Such is the principal upon which the present invention is based.

Figure 1:
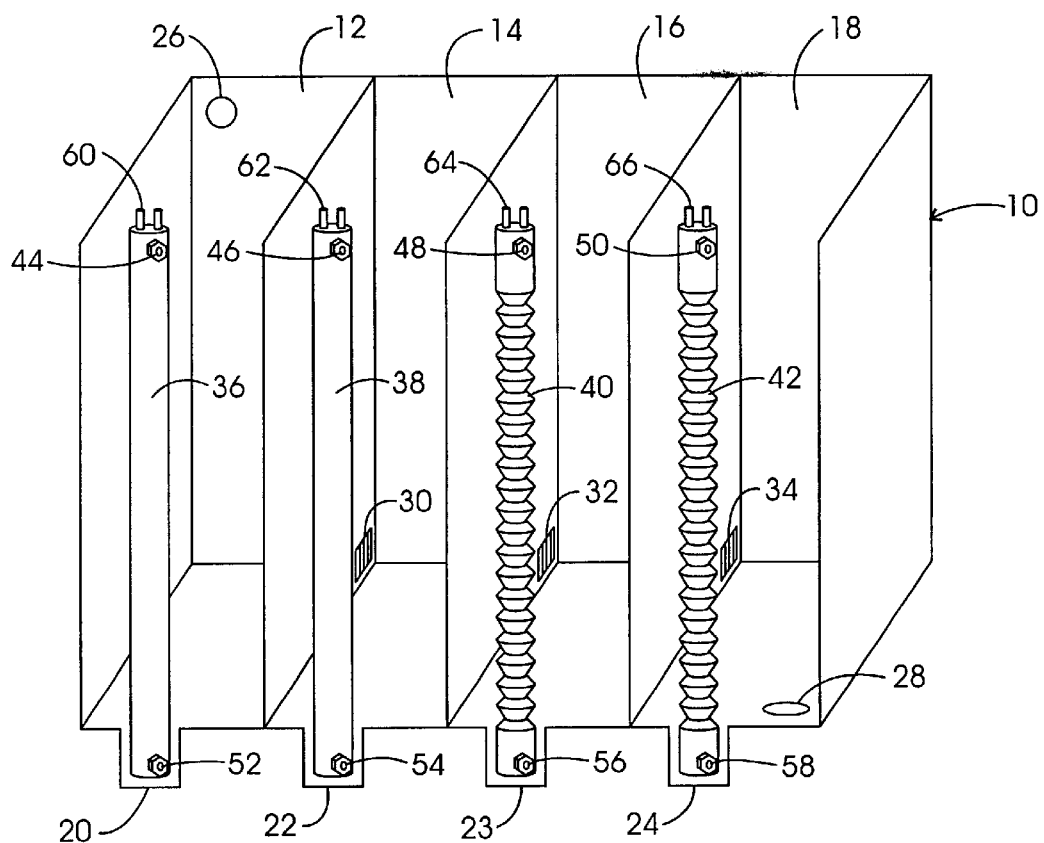
FIG. 1 is a simplified, cut-away, perspective view of a liquid tank having four compartments in each of which is disposed one of two different embodiments of the alternative liquid environment(ALE) tube.

This can be understood by referring to FIG. 1 which is a simplified, cut-away, perspective view of a liquid tank having four compartments in each of which is disposed one of two different embodiments of the alternative liquid environment tube (ALE) of the present invention. Specifically, tank 10 is seen to be composed of compartments 12, 14, 16, and 18. Each compartment contains sump, 20, 22, 23, and 24, respectively. Compartment 12 is fitted with upper liquid inlet 26 while compartment 18 is fitted with lower liquid outlet 28. Flow regulator 30 permits liquid to flow between compartments 12 and 14, flow regulator 32 permits liquid to flow between compartments 14 and 16, and flow regulator 34 permits liquid to flow between compartments 16 and 18.

Housed within compartments 12–18 are ALEs 36, 38, 40, and 42, respectively. ALEs 36/38 are cylindrical in shape with a smooth exterior surface. ALEs 40/42 are shown as flexible cylindrically shaped tubes. It will be appreciated that a variety of additional shapes of ALEs suitably could be used to advantage in the present invention. For example, the ALEs could be other than cylindrical in shape and do not even have to be uniform in cross-sectional area. Of importance is that they are much smaller in volume and cross-sectional area than the main tank being monitored so as to establish an alternative and smaller liquid environment. When a liquid is housed therein, its surface is much less disturbed by dynamic forces impressed upon such alternative and smaller liquid environment which translates into much more accurate measurements of the amount (volume) of liquid housed therein. Often, knowing the level of the liquid housed therein translates into knowledge of the volume of liquid because the tank has been calibrated.

The lower ends of ALEs 36–42 and disposed in sumps 20–24, respectively, while the upper ends of ALEs 36–42 are vented to the headspace of the respective compartments in which they are disposed via vents 44, 46, 48, and 50, respectively. While not shown in FIG. 1, the headspace in each compartment 12–18 are interconnected so as to exhibit the same pressure in each headspace. It should be observed that with flow regulators 30–34 closed, each compartment 12–18 becomes its own liquid tank and each corresponding ALE 36–42, respectively, would be used to measure the amount of liquid in each individual compartment. In this situation, the headspace in each compartment would not have to be interconnected and each compartment would need to be fitted with its own inlet and outlet. With flow regulators 30–34 open, the liquid level in each compartment 12–18 would be the same and ALEs 36–42 each should provide the same reading under static conditions. Under g loading conditions, however, the readings would not be the same. Perhaps, averaging of readings could be used to ensure accuracy of measurement.

Each ALE 36–42 has orifice 52, 54, 56, and 58, respectively, disposed at its lower end in sumps 20–24, respectively. Each ALE 36–42 also has liquid detection sensors housed therein as evidenced by sensor terminals 60, 62, 64, and 66, respectively, such sensors disposed therein for detecting the level of the liquid housed therein. Such sensors are conventional in nature, such as, for example, petroleum sensor model number CGF-12 (Centroid Products, Inc., Edgewater, Fla.).

Figure 2:
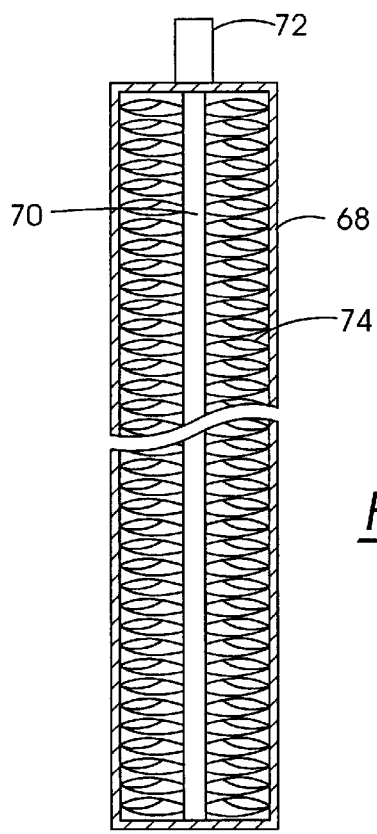
FIG. 2 is a longitudinal sectional view of the ALE tube.

A typical such ALE is illustrated in FIG. 2. ALE 68 is shown to be cylindrical in shape and houses elongate sensor probe 70 whose signal is distributed therefrom via upper terminals 72. Also housed within ALE 68 is packing or cilia type fluid stabilizer 74. Such packing permits liquid to flow readily within ALE 68, but does retard slosh of the liquid when ALE 68 is subject to dynamic forces. Not shown in FIG. 2 is an upper vent to equilibrate the headspace in ALE 68 with the pressure in the headspace in the tank associated with ALE 68 and the lower orifice that conducts the liquid between the tank the ALE 68.

As will be demonstrated in the Examples, the size of the orifice that conducts liquid between the ALE and the tank must be sized appropriately if the ALE is to provide the accuracy and responsiveness desired by the user. That is, if the orifice is too small in size then the time that it takes for a change in liquid level in the tank to be reflected in the ALE will be so long as to make the ALE liquid measurement too late in time and, hence, of little practical value. This time constant, or time delay between a change in liquid level in the tank being reflected in the ALE, may be desired to be almost instantaneous in some uses, though other uses may tolerate longer such time delays. For example, when transporting an environmentally toxic liquid, a very short time constant is highly desirable so that unwanted tank leaks can be detected immediately and remedial action taken to prevent too much unwanted disturbances in the environment due to leakage of the toxic liquid from the tank. In racecar situations, the short time constants are desired so that the driver and crew can adjudge when to bring the car in for re-fueling. Other uses will dictate other time constants to be designed into the ALE to judicious selection of the orifice size.

Then, too, if the viscosity of the liquid being housed in the tank is too high, then too small of an orifice might even prevent flow of the liquid into the ALE. Thus, the size of the orifice also must be large enough to accommodate adequate flow of the liquid from the tank into the ALE and vice versa. However, if the orifice size becomes too large, then the flow of liquid will be unimpeded and this is not desirable either.

For example, if the orifice size is too large then dynamic forces exerted on the tank/ALE may cause the liquid in the ALE to flow back into the tank with consequent loss of accuracy in measuring the level of liquid housed in the ALE. Thus, the orifice also act as a flow restrictor in retarding free flow of fluid between the tank and the ALE. Thus, a careful balance must be struck in determining the proper size (or size range) for the liquid transfer orifice.

In this regard, the orifice must be calibrated for the particular type of liquid being housed within the vessel. Specifically, the fluid properties of the liquid must be correlated to the size of the orifice so that the tube liquid level measured by said sensor assembly is substantially unaffected by said intermittent dynamic forces. The Example will expand upon this aspect of the present invention.

The following Example shows how the present invention can be practiced, but it should not be construed as limiting. In this application, all citations are expressly incorporated herein by reference.

EXAMPLE

Determination of liquid transfer orifice size was made using fuel tank 74 (a 4 gallon drag racing molded polyurethane fuel tank, Racer Components, Inc., Division of Super Chip) as illustrated in FIGS. 3 and 4. It will be observed that fuel tank 74 essentially is rectangular in shape with a pair of outer rectangular wing chambers 76 and 78 and lower wedge section 80 terminating with fluid outlets 82 and 89. Fuel tank 74 is fitted at its top with fluid inlet 86, atmosphere vent 88, and fluid sensor port 90. Housed within fuel tank 74 is ALE tube 92. ALE tube 92 had an outside diameter of 0.850" and a length of 10" and was composed of aluminum. The tube also was vented to atmosphere.

Housed with ALE tube 92 was a petroleum sensor not shown in the drawings (petroleum sensor model number CGF-12, outside diameter of 0.620" and a length of 10", Centroid Products, Inc., Edgewater, Fla.) that reads out voltage to an accuracy of 0.01 v and was of the continuous polling type rated at 12 v and 3 amp. A 12 v, 3 amp power supply provided the current to the sensing device. A digital multimeter (Model 383273 with RS-232 interface, Extech Instruments) with voltage output readings and with a serial port was connected to the sensor to monitor the readings. The voltage readings were transferred to a desktop computer loaded with the multimeter software which has the capability of capturing and storing high and low readings (voltages).

The fluids tested were kerosene (K1) and 10W40 motor oil. These fluids were tested at 68° F. One gallon (128 ounces) of fluid was added to the tank for the static and dynamic tests. Fluid was drained from the static tank to determine a static drop rate (time in seconds to drain 1 gallon of fluid). The one gallon test fluid was determined to measure 3.25 in height in the tank, as measured near the outlet in the lower wedge section.

Static measurements were taken with the tank setting on level on fixture 94 depicted in FIG. 5. Fixture 94 also was fitted with 45° tank holding bays which were used for the motion tests. Motion tests consisted of placing fuel tank 74 at 45° for 3 seconds, level for 3 seconds, and then 45° in the opposite direction for 3 seconds. These 3 positions were repeated for 5 cycles to determine minimum and maximum readings. Different size orifices were evaluated in order to determine responsiveness of ALE tube 92. The following data (in milli-amperes, mA) were recorded:

TABLE 1

| Orifice Size (in) | Static (v) | Maximum (v) | Minimum (v) | Variation (v) | Drop Rate* (sec) |
|---|---|---|---|---|---|
| Kerosene | | | | | |
| 0.024 | 2.58 | 2.37 | 2.21 | 0.16 | 85 |
| 0.040 | 2.58 | 2.20 | 1.93 | 0.27 | 13 |
| 0.060 | 2.58 | 2.59 | 1.32 | 1.27 | 8 |
| None | 2.58 | 2.41 | 0.43 | 1.98 | 3 |
| Motor Oil | | | | | |
| 0.090 | 3.53 | — | 3.08 | — | 98 |
| 0.120 | 3.53 | 3.28 | 3.01 | 0.27 | 52 |
| 0.150 | 3.52 | 3.28 | 2.98 | 0.30 | 52 |
| 0.180 | 3.54 | 3.40 | 2.79 | 0.61 | 23 |
| None | 3.54 | 3.30 | 1.41 | 1.89 | 10 |

*Drop Rate is the time to drain 1 gallon of fluid from fuel tank 74.

Figure 6:
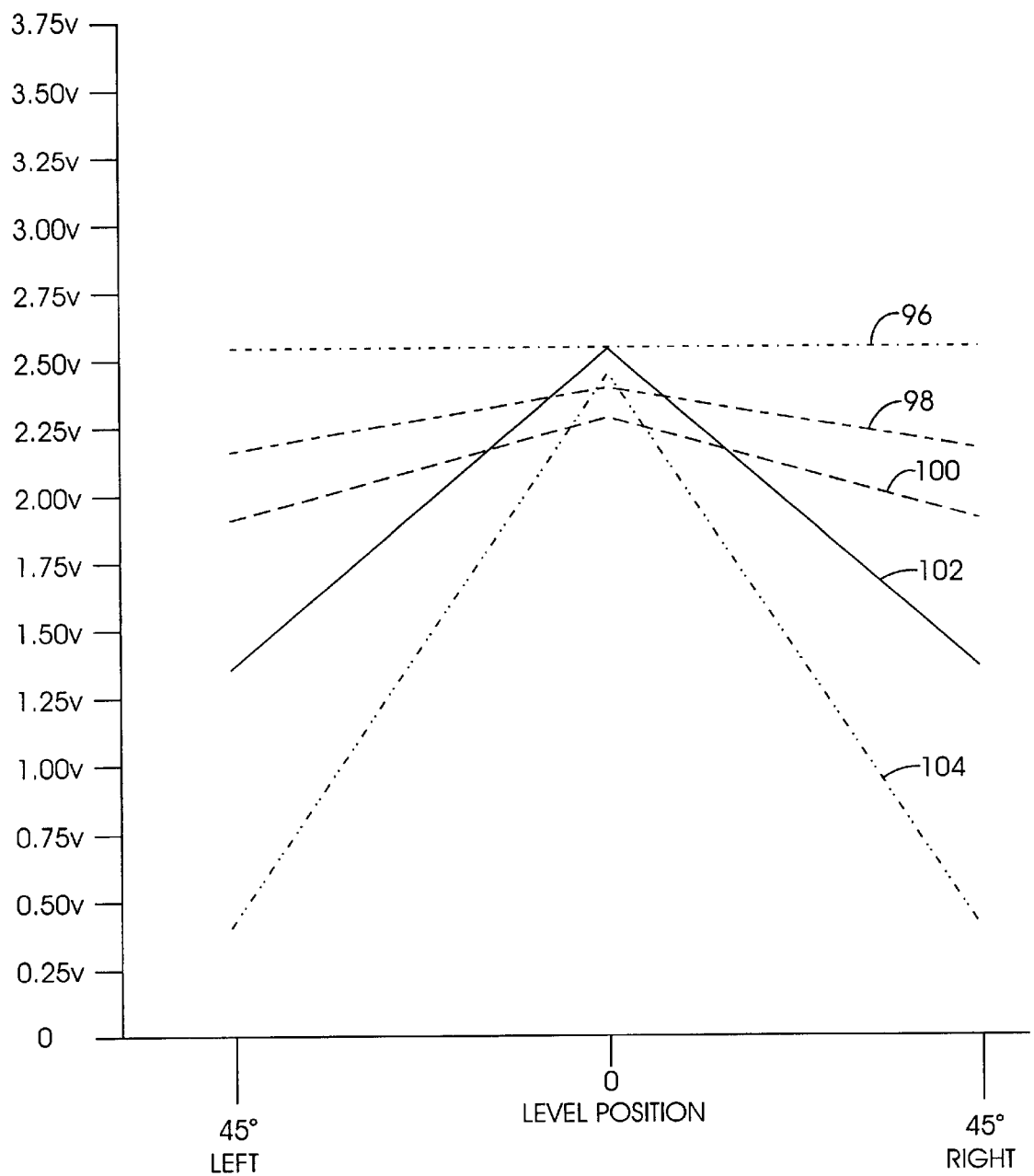
FIG. 6 graphically depicts the ALE tube data recorded in the Example for kerosene.
Figure 7:
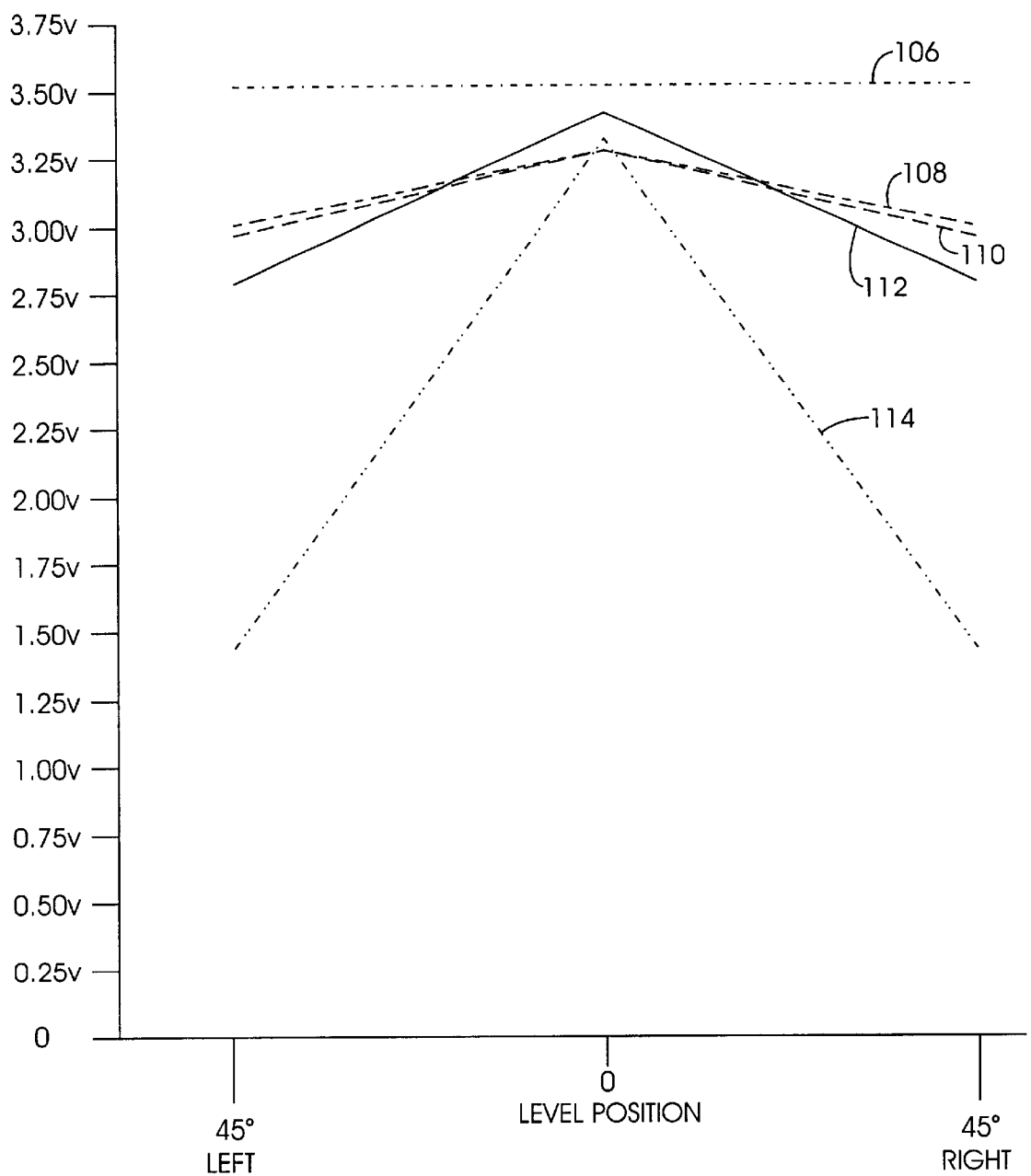
FIG. 7 graphically depicts the ALE tube data recorded in the Example for 10W40 motor oil.

The above-tabulated results are depicted graphically in FIG. 6 (kerosene) and FIG. 7 ( 10W40motor oil) which display sensor voltage readings as a function of the position of fuel tank in fixture 94. Specifically in FIG. 6, line 96 is the static voltage reading (and, hence, volume or amount of kerosene) for fuel cell when at rest. Line 98 represents the data displayed in Table 1 for the 0.024 in orifice, line 100 represents the data displayed in Table 1 for the 0.040 in orifice, line 102 represents the data displayed in Table 1 for the 0.060 in orifice, and line 104 represents the data displayed in Table 1 for "None"(no ALE tube used). Specifically in FIG. 7, line 106 is the static voltage reading (and, hence, volume or amount of motor oil) for fuel cell when at rest. Line 108 represents the data displayed in Table 1 for the 0.120 in orifice, line 110 represents the data displayed in Table 1 for the 0.150 in orifice, line 112 represents the data displayed in Table 1 for the 0.180 in orifice, and line 114 represents the data displayed in Table 1 for "None"(no ALE tube used).

It will be observed that the orifice can become so large that its fluid restricting function is lost and the tube will yield false readings due to the same dynamic forces. While not shown in this data, the orifice also can become so small that the fluid level will not equilibrate timely with the fluid level in the tank. With the tube arrangement, the tube will dampen the dynamic force affect on the tank level for the time constant measured. For different time constants, fuel tank designs, and type of fuel, orifice sizes can be determined by similar measurements so that measurement of fuel level is enhanced in the presence of dynamic forces.

These data also demonstrate that viscosity of the liquid will cause the size of the orifice to vary. Temperature is important in this regard because viscosity of liquids varies with temperature.

Figure 8:
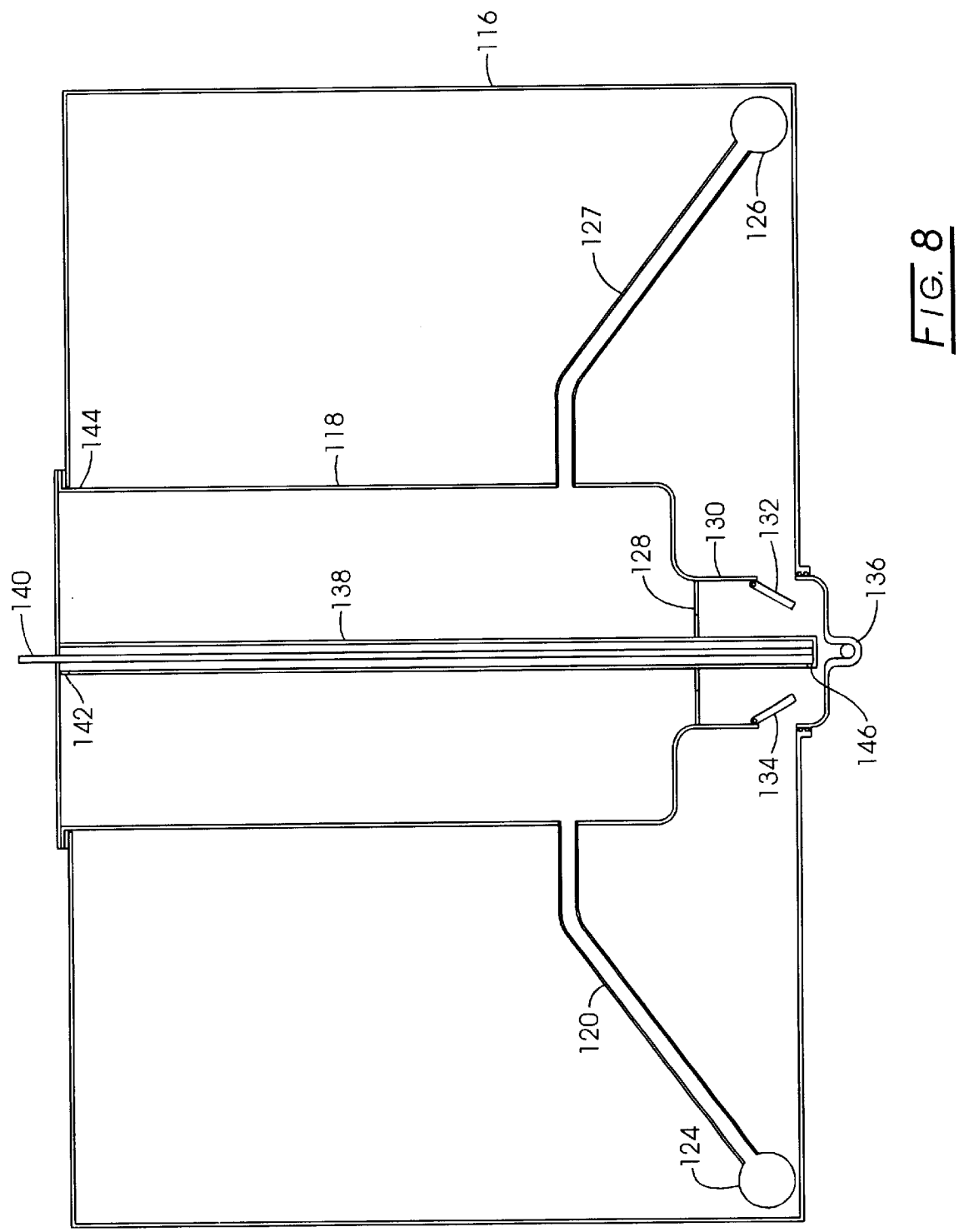
FIG. 8 graphically depicts an alternative fuel cell fitted with the ALE tube.

In racecar environments, keeping track of fuel spent during a race does not have to be precise until the last few gallons of racing fuel are encountered. That is, keeping track of the amount of fuel charged into the fuel tank coupled with conventional on-board fuel monitors will suffice most of the time. Often, such conventional fuel monitoring may be sufficient for an entire race, depending upon caution flags, accidents, and other race happenings that determine refueling of the racecar. There are those occasions, however, when the team manager needs to precisely know when the fuel cell contains the last few gallons of fuel so that a re-fueling decision can be made. An improved racecar fuel cell ALE, then, is illustrated in FIG. 8 where fuel cell 116 is shown to be fitted with catch tank 118 located in approximately the center of fuel cell 116. Lines 120 and 122 connect catch tank 118 with scavenge pumps 124 and 126, respectively. These pumps may be located in the corners of fuel cell 116. It will be appreciated that fuel cell 116 could contain additional scavenge pumps, depending upon the design of fuel cell 116. Catch tank 118 can be fitted with baffle 128 (e.g., an apertured plate) to isolate lower chamber 130, which functions much like a sump. Fuel housed in fuel cell 116 can enter chamber 130 via one-way valves 132 and 134. Fuel is withdrawn from chamber 130 via outlet 136. In this regard, the area of fuel cell 116 that forms the bottom of chamber 130 extends downward from the bottom of fuel cell 116 to enhance its sump appearance and function.

ALE 138 is disposed centrally within catch tank 118 and is fitted with sensor 140 its entire longitudinal length. Breather hole 142 equilibrates the interior of ALE 138 with catch tank 118 as does breather hole 144 in catch tank 118 equilibrate catch tank 118 with the interior of fuel cell 116. Thus, each environment has its headspace in equilibrium with each other. The lower end of ALE 138 terminates at the lower end of chamber 130 with aperture 146 providing liquid communication for the fuel within chamber 130 to flow to within ALE 138. Chamber 130 can be designed to have any desired volume, say, 1 gallon, 2 gallons, 2.5 gallons, etc. Such small volume, then, is isolated from the main volume of fuel cell 116 as is the volume within ALE 138 isolated from both fuel cell 116 and catch tank 118. In the design set forth in FIG. 8, ALE 138 can very accurately measure the amount of fuel in catch tank 118 and in particular within chamber 130. This design, then, permits a quite accurate measurement of the last amount of fuel in fuel cell 116. It will be appreciated that the design of fuel cell 116 can be accommodated for a variety of additional uses other than for racecars, e.g., non-racecar vehicles, hazardous waste storage, etc.

What is claimed is:

1. A system for determining the amount of liquid housed within a vessel subject to intermittent dynamic forces wherein the liquid in said vessel may be discharged intermittently, which comprises:

a sensing tube of substantially less volume than said vessel which tube also is subject to said intermittent dynamic forces, said sensing tube being fitted with a sensor assembly for measuring the level of liquid therein; said tube being in fluid communication with said vessel through an orifice in said vessel whereby the liquid level in said vessel is the same as the liquid level in said tube, the size of said orifice being such that the tube liquid level measured by said sensor assembly is substantially unaffected by said intermittent dynamic forces.

2. The system of claim 1, wherein the tube sensor assembly is in connection with a readout monitor for displaying the level of liquid in said tube.

3. The system of claim 1, wherein said tube is baffled.

4. The system of claim 1, wherein a plurality of said tubes are placed within said vessel.

5. The system of claim 1, wherein said tube is symmetrical in shape.

6. The system of claim 1, wherein said tube is located outside of said vessel but said orifice is in fluid connection with said vessel to permit fluid transfer between said vessel and said tube.

7. The system of claim 1, wherein said tube is housed within said vessel.

8. The system of claim 7, wherein said tube is located at the bottom of said vessel.

9. The system of claim 7, wherein said vessel has a lower sump and the tube orifice is located in said sump.

10. The system of claim 1, wherein said tube is flexible.

11. The system of claim 1, wherein said liquid in said vessel has liquid level above which is a vessel headspace and said tube has tube headspace that is held at the same pressure as said vessel headspace.

12. The system of claim 1, wherein said sensing tube is placed at about the center of the fluid housed in said vessel.

13. The system of claim 1, wherein an intermediately sized catch tank is disposed within said vessel, said tube is disposed within said catch tank.

14. The system of claim 13, wherein said catch tank retains interior baffles that form a lower chamber wherein the orifice of said tube is disposed.

15. The system of claim 14, wherein said chamber has a valve to permit liquid within said vessel to flow thereinto.

16. The system of claim 14, wherein said vessel is fitted with pumps that feed liquid in said vessel to within said catch tank.

17. The system of claim 15, wherein said vessel is fitted with pumps that feed liquid in said vessel to within said catch tank.

18. A method for determining the amount of liquid housed within a vessel subject to intermittent dynamic forces wherein the liquid in said vessel may be discharged intermittently, which comprises:

(a) providing a sensing tube of substantially less volume than said vessel which tube also is subject to said intermittent dynamic forces, said sensing tube being fitted with a sensor assembly for measuring the level of liquid therein, said sensor assembly being connected to a read-out monitor; said tube being in fluid communication with said vessel through an orifice in said vessel whereby the liquid level in said vessel is the same as the liquid level in said tube, the size of said orifice being such that the tube liquid level measured by said sensor assembly is substantially unaffected by said intermittent dynamic forces; and (b) monitoring said sensors with said read-out monitor to determine the level of liquid in said vessel.

19. The method of claim 18, wherein a plurality of said tubes are placed within said vessel.

20. The method of claim 18, wherein said vessel has a lower sump and the tube orifice is located in said sump.

21. The method of claim 18, wherein said tube is symmetrical in shape.

22. The method of claim 18, wherein said vessel is monitored to determine the initial discharge of liquid therefrom.

23. The method of claim 18, wherein said vessel is monitored to determine the ultimate discharge of liquid therefrom.

24. The method of claim 18, wherein said sensing tube is placed within said vessel.

25. The method of claim 18, wherein said tube is located outside of said vessel but said orifice is in fluid connection with said vessel to permit fluid transfer between said vessel and said tube.

* * * * *